June 26, 1934.      H. BEHR      1,964,243
MAGNIFIER
Filed Jan. 9, 1933
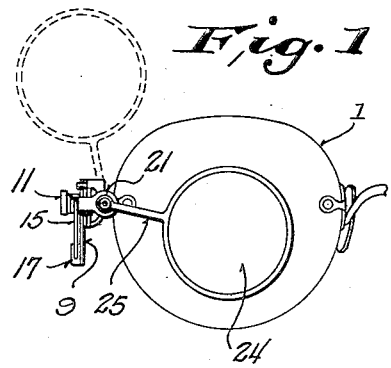
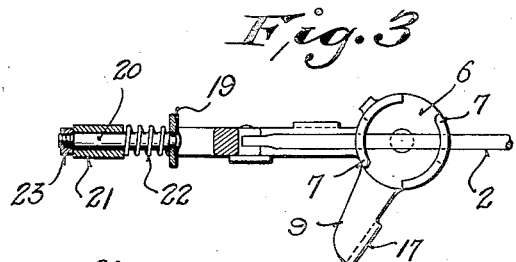
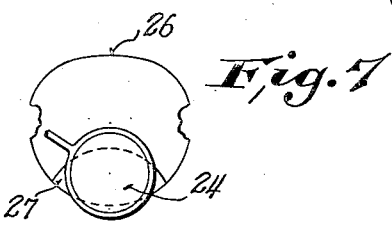
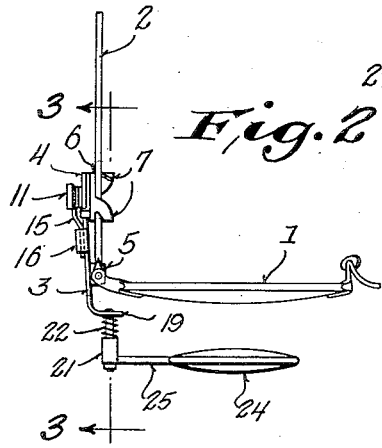
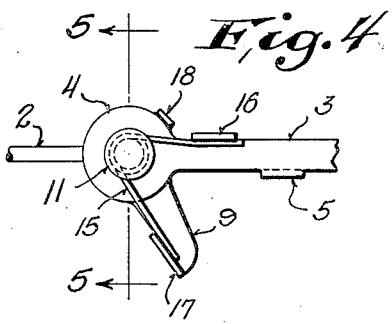
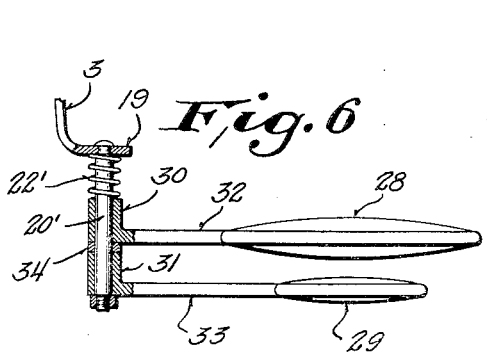
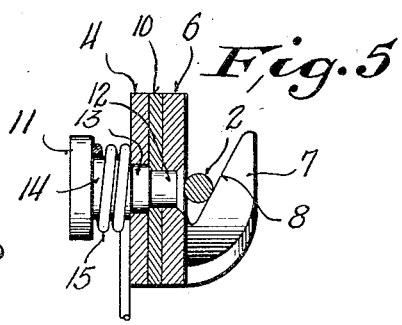
INVENTOR
BY Henry Behr
Arthur R. Woolfolk
ATTORNEY Patented June 26, 1934

1,964,243

UNITED STATES PATENT OFFICE 1,964,243

MAGNIFIER

Henry Behr, Milwaukee, Wis.

Application January 9, 1933, Serial No. 650,743

6 Claims. (Cl. 88—41)

This invention relates to magnifiers and is particularly directed to a magnifier for use in close work, such as watch making, jewelry, or other work of this or a similar nature.

In magnifiers as heretofore constructed it is the usual practice to provide a cup which is held by the brow and cheek of the user, but this type of device precludes the use of spectacles. On the other hand, magnifiers have been made in which a frame is provided which fits over the spectacle lens, but these devices are inconvenient in that when bifocal glasses are used, it is almost impossible to properly align the optical center of the magnifier with the optical center of the bifocal segment. In addition, these devices have the defect that they must be removed bodily from the lens of the spectacle before the operator can look outwardly at a distance. Both types of these devices are awkward to wear and use.

This invention is designed to overcome the above noted defects, and objects of this invention are to provide a novel form of magnifier for use with glasses which is so made that it readily clamps a supporting portion in a detachable manner to the spectacle, and which is so made that the lens is pivotally carried by this support and may be freely rocked downwardly into the exact position most convenient for use, either with an ordinary pair of glasses or for use with the bifocal segment of bifocal glasses, or which may be rocked upwardly out of the field of the glasses so that the operator may look outwardly at a distance at any time without removing the device from his glasses.

Further objects are to provide a magnifier which is extremely simple in construction, which has a spring pressed latch or clamp readily manipulable by an inconspicuous, relatively small lever or finger piece, which will fit any size of temple and which may be rocked into position or out of position without at any time engaging the lens of the spectacles and thereby avoiding all possibility of scratching or damaging the lens.

Further objects are to provide a magnifier which is cheap to make, which may be instantly applied or removed, and which, in one form of the invention, may be provided with a plurality of magnifying lenses, either one or both of which may be used to suit the particular requirements of the work in hand.

Embodiments of the invention are shown in the accompanying drawing, in which:

Figure 1 is a fragmentary view of a pair of eye glasses with the device applied thereto, showing in dotted lines the device in its inoperative positon.

Figure 2 is a plan view of the structure shown in Figure 1.

Figure 3 is a sectional view on the line 3—3 of Figure 2.

Figure 4 is a side view of the locking clamp.

Figure 5 is an enlarged sectional view on the line 5—5 of Figure 4.

Figure 6 is a fragmentary view of a modified form of the invention.

Figure 7 shows the use of the device with a bifocal glass.

Referring to the drawing, particularly Figures 1 and 2, it will be seen that the spectacle or eye glass lens, which will hereinafter be referred to as the spectacle lens, is indicated by the reference character 1, and the temple by the reference character 2.

The device comprises a body portion consisting of an elongated, forwardly extending arm or part 3 and a disk 4. The elongated part 3 is provided with a lip 5 which fits beneath the temple 2 and the disk 4 has pivoted thereto a locking hub 6, see particularly Figures 2, 3 and 5.

This locking hub is provided with oppositely directed clamping jaws or hooklike members 7 which are provided with inner cam faces 8 adapted to engage the temple 2 from opposite sides and to force the temple against the base 6 of the hub. A manipulating handle or lever 9 is either formed integrally with the hub 6 or is secured thereto by providing the arm or lever 9 with a disk 10, which is sweated or otherwise secured to the hub 6, see Figure 5, so that when the arm is rocked, the hub and the jaws 7 thereof are correspondingly rotated.

The pivot pin 11 for the locking hub is provided with a reduced portion 12 which passes through the members 10 and 6 and is riveted thereto, a larger shouldered part 13 being provided and passing through the stationary disk 4 of the body part. An enlarged portion 14 is also provided, around which a spring 15 is loosely wrapped. The spring is provided with outwardly extending arms, one of which is fitted beneath an outwardly turned lip 16, see Figure 4, formed integrally with the forwardly projecting arm 3, and the other lip 17 formed integrally with the lever or manipulating member 9.

As a matter of actual fact, the lip 17 is engaged by the thumb or finger of the operator in positioning the device, and thus provides a sufficiently extensive bearing surface against which the finger presses during the positioning of the device to readily permit the operation of the lever 9.

Further, the lip 17 limits the counter-clockwise rocking of the locking hub, as viewed in Figure 4. Also a lip 18 is provided to limit the clockwise rocking of this locking hub, as viewed in Figure 4.

The body portion or forwardly extending arm 3 projects beyond the forward end of the temple and is provided with an inwardly turned end 19 to which a stem 20 is riveted or otherwise secured, see Figure 3. This stem pivotally carries a hub 21 which is pressed outwardly by means of the small helical spring 22 against a head or nut 23 carried by the stem 20.

In forming the device it is preferable to make the body portion 3 of relatively hard material and to anneal the curved portion which terminates in the inwardly bent portion 19. This forms a somewhat softened bent lip on the device which permits bending the lip so as to adjust the magnifier properly with respect to any particular lens that may be used. It is obvious that the user merely adjusts the device once and for all by initially bending the inwardly turned lip until the magnifier properly aligns with and is properly positioned with respect to the spectacle lens. Thereafter no further adjustment is needed.

In the form shown, a nut 23 is employed which is screwed tightly against a shouldered portion of the stem or pin 20. However, it is obvious that other forms of heads may be provided for the pin 20.

The magnifying lens 24, see Figure 2, is supported from an arm 25 extending radially from the pivotally mounted hub 21. The spring 22 provides just sufficient friction so as to hold the magnifying glass or magnifier in any position that it may be set to prevent its dropping downwardly through jarring or other causes. However, the magnifying glass or magnifier may be radially rocked into the most convenient position for the operator.

A further important feature of this invention is the ease with which this device can be used with a bifocal lens, as indicated at 26 in Figure 7. The magnifying glass 24 may be rocked in front of the bifocal segment 27 with the utmost facility and can be accurately aligned therewith for the greatest convenience of the operator.

In the form of the invention shown in Figure 6 two magnifiers or magnifying lenses 28 and 29 are provided, preferably the outermost lens 29 being of smaller diameter though centrally located with reference to the innermost lens 28.

The pin 20' is elongated over that previously described and carries two hubs 30 and 31, from which arms 32 and 33 project outwardly to the respective lenses 28 and 29. It is obvious that the spring 22' provides pressure for both hubs to hold either one or both of the magnifiers in their adjusted position. If desired, a small spacing washer 34 may be positioned between the hubs so that the rocking of one is not likely to effect rocking of the other.

For certain types of work one magnifier alone may be sufficient. However, if greater magnification is required, it is a very simple matter to rock the other magnifying lens into position. It is also obvious that the same facility of use with bifocal lenses is furnished by this second form of the invention as that described for the first form. This feature is of considerable importance in the practical application of this invention, for whenever bifocal glasses have heretofore been used, it has been found extremely difficult to utilize the usual magnifiers.

With this invention the device may be most easily applied to or removed from the spectacles, and also the operator may readily rock it out of position or may again rock it into position as required from time to time during his work.

Although this invention has been described in considerable detail, it is to be understood that such description is intended as illustrative rather than limiting, as the invention may be variously embodied and is to be interpreted as claimed.

I claim:

1. A magnifier for spectacles having lenses and temples, comprising a body portion having a forwardly projecting stem, a spring pressed clamp carried by said body portion for engaging a temple, a hub freely revolubly mounted upon said stem, a magnifying lens supported from said hub and adapted to be swung about said stem, and a spring for causing a yielding holding effect between said stem and said hub, whereby said lens will be temporarily held in any desired adjusted position.

2. A magnifier for spectacles having lenses and temples, said magnifier comprising a body portion adapted to be positioned adjacent a temple and having a lip adapted to hook on to said temple, a revolubly mounted hub carried by said body portion and having arms for engaging opposite sides of said temple, a spring tending to rotate said hub to cause said lip to bear against said temple, a magnifying lens, and means supporting said lens and pivotally supported from said body portion, whereby said magnifying lens may be swung in front of or away from said lens.

3. A magnifier for spectacles having lenses and temples, said magnifier comprising a body portion adapted to be positioned adjacent a temple and having a lip adapted to hook on to said temple, a revolubly mounted hub carried by said body portion and having arms for engaging opposite sides of said temple, a spring tending to rotate said hub to cause said lip to bear against said temple, a manipulating lever rigid with said hub, a magnifying lens, and means supporting said lens and pivotally supported from said body portion, whereby said magnifying lens may be swung in front of or away from said lens.

4. A magnifier for spectacles having lenses and temples, said magnifier comprising a body portion adapted to be positioned adjacent a temple, a revolubly mounted hub carried by said body portion and having hooklike arms for engaging said temple on opposite sides thereof, a lip carried by said body portion and adapted to engage said temple, a spring tending to rotate said hub with reference to said body portion, a manipulating hand lever rigid with said hub, a stem carried by said body portion and projecting outwardly beyond the front end of the said temple when said device is in position, a magnifying lens, and means for carrying said magnifying lens and pivotally carried by said stem whereby said magnifying lens may be rocked about said stem into operative or inoperative position.

5. A magnifier for spectacles having lenses and temples, said magnifier comprising a body portion adapted to be positioned adjacent a temple, a revolubly mounted hub carried by said body portion and having hooklike arms for engaging said temple on opposite sides thereof, a lip carried by said body portion and adapted to engage said temple, a spring tending to rotate said hub with reference to said body portion, a manipulating hand lever rigid with said hub, a stem carried by said body portion and projecting outwardly beyond the front end of the said temple when said device is in position, a magnifying lens, and means carrying said magnifying lens and pivotally carried by said stem whereby said magnifying lens may be rocked about said stem into operative or inoperative position, said stem having a head and a spring surrounding said stem and forcing the lens carrying means against said head, whereby said magnifying lens will be frictionally retained in any position of rocking adjustment about said stem.

6. A magnifying device for spectacles having lenses and temples, said magnifying device comprising a body portion adapted to be positioned adjacent one of said temples, spring pressed clamping means for locking said body portion to said temple, a finger piece for releasing said spring pressed means, a forwardly projecting stem carried by said body portion and adapted to extend outwardly beyond the front end of said temple, a pair of magnifying lenses mounted one in front of the other, and means independently carrying each magnifying lens and pivotally supported by said stem.

HENRY BEHR.